March 5, 1968   J. A. RYDBERG   3,371,678
NON-RETURN VALVE WITH ROTATING MEANS
Filed May 7, 1964
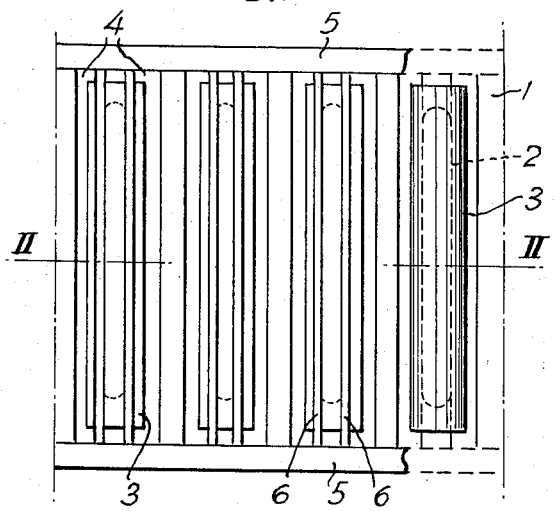
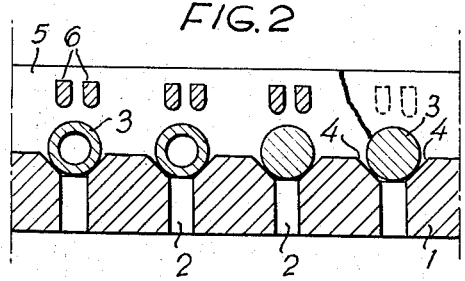
INVENTOR.
John Anders Rydberg
BY
Pierce Schiffler & Parker
attorneys

United States Patent Office 3,371,678
Patented Mar. 5, 1968

3,371,678
NON-RETURN VALVE WITH ROTATING MEANS
John Anders Rydberg, Stockholm, Sweden, assignor to Aktiebolaget Gustavsbergs Fabriker, Gustavsberg, Sweden, a corporation of Sweden
Filed May 7, 1964, Ser. No. 365,637
Claims priority, application Sweden, May 7, 1963, 5,007/63
1 Claim. (Cl. 137—331)

In compressors, for instance, it is known to use inlet and outlet valves of a type consisting of a thin movable steel plate covering a slot or opening of other form in a steel plate forming the seat of the valve. The movable steel plate is usually pressed against the seat by aid of a spring. The valve allows the passage of the flowing medium in one direction but not in the other. In reciprocating compressors the closure usually is slow as the piston moves with a low speed at its end positions. The movable steel plate, therefore, has a long length of life.

In certain cases, valves of this kind are used to prevent the through flow of exploding mixtures of air and combustibles. The valve is thereby closed rapidly and if a movable steel plate is used as a movable valve member, the plate will be subjected to severe impact stresses. These impact stresses can be modified by covering the valve member or the valve seat with an elastic material, preferably rubber, but then a severe wear of the rubber coating will occur along the edges of the through flow opening of the seat.

The present invention concerns a non-return valve provided with a seat, the section of which has the form of a mainly V-like groove in the bottom of which one or several through flow openings are provided, the valve member thereof being cylindrical and in closing position engaging the walls of said groove with the envelope surface thereof. The non-return valve is mainly characterized by the fact that said valve member is manufactured of an elastic material, as for instance crude rubber, synthetic rubber or the like. As the valve member does not have any frail edges which can be damaged and as it rotates at random in action the wear against the valve seat will be equally distributed over the whole cylindrical surface. Thus local wear of the cylinder is prevented and as the wear is equally distributed round the cylinder the service life of same will be long.

The invention will hereinbelow be more closely explained with reference to accompanying drawing showing an embodiment of same. FIG. 1 shows a top view of a part of a valve unit consisting of a number of non-return valves according to the invention while FIG. 2 is a section along the line II—II of FIG. 1.

As shown in the drawing, the valve unit comprises a plate 1 for instance of steel, which is provided with slits 2 or the like, terminating at some distance from the edges of the plate. Along each slit 2 said plate 1 on one side thereof is provided with a groove of mainly V-like cross-section, said groove extending along the whole width of the plate 1 and sloping sides thereof forming a guide for a cylindrical valve member 3 of elastic non-metallic material, as for instance, crude rubber, synthetic rubber or the like. The inclination of the side walls of the groove denoted by 4 on the drawing is such that the valve member in its closing position rests against the edges of the opening formed by the slit 2 in the bottom of said groove. As seen in FIG. 1, the valve member 3 is longer than the slit 2 but shorter than the width of the plate 1.

Side pieces 5 are arranged along the longitudinal edges of the plate 1, said side pieces limiting the movements of said valve members 3 in axial direction and carrying pairwise arranged rails 6 extending across the plate 1 and limiting the lifting movement of the valve members 3. The rails 6 are furthermore so arranged that they prevent movement of the valve members 3 sideways out of the action zone of the medium stream which brings the valve members into the closing position.

The valve members 3 can be solid as shown in the right part of FIG. 2 or tubular as shown in the left part of FIG. 2. It is often desirable that the valve members are as light as possible and the tubular valve members are most suitable. The rubber material can be without reinforcement but it is often preferable to reinforce said material with fabric or fibres of non-metallic or metallic material (not shown). In order to stiffen the valve member a rod or tube-formed case (not shown) can be inserted therein, which case can be manufactured from a harder quality of the material forming the soft envelope surface of the valve member, but of course any suitable material, including metal, can be chosen for the core.

Depending on the range of application, a common quality of crude or synthetic rubber can be chosen for the envelope of the valve members but also special kinds which are especially resistant to wear, oil or heat, as for instance silicon or fluorine rubber, can be used.

In certain embodiments the through flow openings through the valve seat are formed as straight slits but they can also have the form of rows of holes. The grooves forming the valve seats are preferably provided with a bottom part which is curved with a radius which at least mainly corresponds to the radius of the valve members. Thereby a satisfactory sealing is provided around each hole as well as at the ends of the grooves in the embodiment shown.

It has been proved that the valve members rotate at random so that the wear becomes even. If it is desirable to increase the rotation this can be accomplished by the stop members, in the example shown as the rails 6, being unsymmetrically formed or placed.

Each valve member is freely movable within a space bordered by the rails 6 and the valve seat. The valve unit can thus be placed in any position, thus also with the valve members extending vertically or obliquely with respect to the vertical. The valve members can furthermore be spring-loaded so that they are pressed against the valve seats in inactive position.

The valve according to the invention is especially suitable as a safety valve in furnaces working with intermittent combustion of the type comprising a combustion chamber provided with an air inlet and an outlet conduit leading therefrom and formed in such a way that the gases exhausted from the combustion chamber after each combustion create a sub-pressure in said chamber so that new combustion air is sucked into same. The safety valve is arranged to prevent the combustion gases from escaping through said air inlet but to offer as small a resistance as possible for the entering air. In such a case the valve is mounted in opposite position to that shown so that the valve members 3 normally rest upon the rails 6 and the valve thus is open, whereby the combustion chamber is ventilated during the inactive periods but can be started merely by injection of fuel and ignition. At the same time the flow resistance is low as the entering air itself does not have to lift the valve members. The valve members can be made very light so that the closing takes place very rapidly at the increase of pressure in the combustion chamber, generated at the combustion.

Even if the longitudinal rails are suitable as stopping means, since the wear caused by them is evenly distributed over the length of the valve member, other types of stopping means can be used. In the embodiment two rails are shown for each valve member but more than two rails can of course be used or only one which can be provided with a suitable profile. Modifications are also conceivable within the scope of the invention.

What I claim is:

1. A valve comprising a seat in the form of a groove with a substantially V-shaped cross-section having at least one through flow opening in its bottom and a cylindrical valve member of an elastic material which is responsive to pressure differential thereon to be lifted from its seat and is mounted for free rotation about its axis when the valve is in open position and engages the walls of the groove with its outer cylindrical surface when it is in closed position, and stopping means for limiting the opening movement of said valve member, said stopping means extending along the whole length of the valve member and being unsymmetrically arranged relative to said axis so that said valve member automatically is given a rotation movement.

References Cited

UNITED STATES PATENTS

| 191,663 | 6/1877 | Ellis | 137—329.05 |

FOREIGN PATENTS

| 1,047,268 | 7/1953 | France. |
| 141,473 | 4/1900 | Germany. |
| 742,633 | 12/1955 | Great Britain. |

WILLIAM F. O'DEA, *Primary Examiner.*

R. GERARD, *Assistant Examiner.*